United States Patent
Oh et al.

(10) Patent No.: US 10,944,965 B2
(45) Date of Patent: *Mar. 9, 2021

(54) APPARATUS FOR ENCODING AN IMAGE

(71) Applicant: M&K Holdings Inc., Seoul (KR)

(72) Inventors: Soo Mi Oh, Seongnam-si (KR); Moonock Yang, Singapore (SG)

(73) Assignee: M&K Holdings Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/725,167

(22) Filed: Dec. 23, 2019

(65) Prior Publication Data
US 2020/0145655 A1    May 7, 2020

Related U.S. Application Data

(63) Continuation of application No. 16/171,548, filed on Oct. 26, 2018, now Pat. No. 10,567,760, which is a (Continued)

(30) Foreign Application Priority Data

Aug. 17, 2010  (KR) ............... 10-2010-0079529
Jun. 30, 2011   (KR) ............... 10-2011-0064301

(51) Int. Cl.
*H04N 19/11*     (2014.01)
*H04N 19/593*   (2014.01)
(Continued)

(52) U.S. Cl.
CPC .......... *H04N 19/11* (2014.11); *H04N 19/593* (2014.11); *H04N 19/70* (2014.11); *H04N 19/80* (2014.11); *H05K 999/99* (2013.01)

(58) Field of Classification Search
CPC ...... H04N 19/11; H04N 19/593; H04N 19/70; H04N 19/80; H04N 7/12; H04N 7/18; H04N 7/32; H05K 999/99
See application file for complete search history.

(56) References Cited

U.S. PATENT DOCUMENTS 7,450,640 B2 * 11/2008 Kim ............... H04N 19/105
                                                  375/240.12
2003/0223495 A1 * 12/2003 Sun ............... H04N 19/197
                                                  375/240.12
(Continued)

OTHER PUBLICATIONS

Chujoh "Description of Video Coding Technology proposal for Toshiba"; JCTVC-A117r1, Dresden, DE, Apr. 2010 (Year: 2010).*

(Continued)

*Primary Examiner* — Dramos Kalapodas

(74) *Attorney, Agent, or Firm* — Nelson Mullins Riley & Scarborough LLP; Kongsik Kim, Esq.

(57) ABSTRACT

Provided is a method that de-multiplexes a bit stream to extract intra prediction mode information and residual signals, restores an intra prediction mode of a current prediction unit using the intra prediction information and intra prediction modes of prediction units adjacent to the current prediction unit, generates reference pixels using one or more available reference pixel if there exist unavailable reference pixels of the prediction unit, adaptively filters the reference pixels based on the restored intra prediction mode, generates a prediction block using the restored intra prediction mode and the reference pixels, decodes the residual signal to generating a residual block, and generates a reconstructed block using the prediction block and the residual block. Accordingly, additional bits resulted from increase of a number of intra prediction mode are effectively reduced. Also, an image compression ratio can be improved by generating a prediction block similar to an original block.

3 Claims, 8 Drawing Sheets

Related U.S. Application Data continuation of application No. 15/189,273, filed on Jun. 22, 2016, now Pat. No. 10,123,010, which is a continuation of application No. 13/624,844, filed on Sep. 21, 2012, now Pat. No. 9,491,478, which is a continuation of application No. PCT/KR2011/005941, filed on Aug. 12, 2011.

(51) Int. Cl.
*H04N 19/70* (2014.01)
*H04N 19/80* (2014.01)

(56) References Cited

U.S. PATENT DOCUMENTS

| | | | |
|---|---|---|---|
| 2003/0223645 A1* | 12/2003 | Sun | H04N 19/196 382/239 |
| 2009/0003441 A1* | 1/2009 | Sekiguchi | H04N 19/11 375/240.13 |
| 2011/0243230 A1* | 10/2011 | Liu | H04N 19/11 375/240.14 |

OTHER PUBLICATIONS

"Codin G of Moving Pictures and Audio" JTC1/SC29/WG11 w1280, Dresden Apr. 2010 (Year: 2010).*
Takeshi Chujoh et al., (hereinafter Chujoh) "Description of Video Coding Technology proposal for Toshiba"; JCTVC-A117r1, Dresden, DE, Apr. 2010 (Year: 2010).*

* cited by examiner

APPARATUS FOR ENCODING AN IMAGE

CROSS-REFERENCE TO RELATED APPLICATIONS

This application is a continuation application of U.S. application Ser. No. 16/171,548 filed on Oct. 26, 2018, which is a continuation application of U.S. application Ser. No. 15/189,273 filed on Jun. 22, 2016, which is a continuation application of U.S. application Ser. No. 13/624,844 filed on Sep. 21, 2012, which is a continuation application of International Application No. PCT/KR2011/005941 filed on Aug. 12, 2011, which claims priority to Korean Application No. 10-2010-0079529 filed on Aug. 17, 2010 and Korean Application No. 10-2011-0064301 filed Jun. 30, 2011, which applications are incorporated herein by reference.

TECHNICAL FIELD

The present invention relates to a method of decoding a moving picture in intra prediction mode, and more particularly, to a method of restoring intra prediction mode, generating a prediction block very similar to an original block, decoding a residual block, and generating a reconstructed block using the prediction block and residual block.

BACKGROUND ART

In image compression methods such as Motion Picture Experts Group (MPEG)-1, MPEG-2, MPEG-4 and H.264/MPEG-4 Advanced Video Coding (AVC), one picture is divided into macroblocks to encode an image. Then, the respective macroblocks are encoded using inter prediction or intra prediction.

In intra prediction, a current block of a picture is encoded not using a reference picture, but using values of reconstructed pixels spatially adjacent to the current block. An intra prediction mode with little distortion is selected by comparing a prediction block generated using the adjacent pixel values with an original macroblock. Then, using the selected intra prediction mode and the adjacent pixel values, prediction values of the current block are calculated. Differences between the prediction values and pixels values of the original current block are calculated and then encoded through transform coding, quantization and entropy coding. The intra prediction mode is also encoded.

In 4×4 conventional intra prediction, there are nine modes of a vertical mode, a horizontal mode, a DC mode, a diagonal down-left mode, a diagonal down-right mode, a vertical right mode, a vertical left mode, a horizontal-up mode and a horizontal-down mode.

According to H.264 standard, one mode is selected among the nine modes to generate a prediction block of the current block. According to HEVC standard under development, there are 17 or 34 intra prediction modes.

However, when some or all values of pixels adjacent to current block do not exist or are not already encoded, it is impossible to apply some or all of the intra prediction modes to the current block. Also, when there is a large difference between adjacent reference pixels, distortion between a prediction block and an original block becomes large. Therefore, the coding efficiency is degraded.

Also, as the number of intra prediction modes increases, a new method of encoding the intra prediction mode of the current block to minimize the amount of coding bits, and a more effective method of decoding the intra prediction mode and generating a reconstructed block are required.

SUMMARY OF THE DISCLOSURE

The present invention is directed to a method of restoring intra prediction mode, generating a prediction block very similar to an original block, decoding a residual block, and generating a reconstructed block using the prediction block and residual block.

One aspect of the present invention provides a method of decoding a moving picture in intra prediction mode, comprising: de-multiplexing a bit stream to extract intra prediction mode information and residual signals, restoring an intra prediction mode of a current prediction unit using the intra prediction information and intra prediction modes of prediction units adjacent to the current prediction unit, generating reference pixels using one or more available reference pixel if there exist unavailable reference pixels of the prediction unit, adaptively filtering the reference pixels based on the restored intra prediction mode, generating a prediction block using the restored intra prediction mode and the reference pixels, decoding the residual signal to generating a residual block, and generating a reconstructed block using the prediction block and the residual block.

A method according to the present invention restores intra prediction mode, and adaptively filters reference pixels in order to generate a prediction block minimizing the difference between a prediction block and an original block. The residual signal is adaptively decoded the intra prediction mode. Therefore, by generating the prediction block very similar to an original block, the amount of bits required to encode the residual block is minimized. Also, by encoding the intra prediction mode of the current block using a plurality of candidates, coding efficiency of intra prediction mode is improved.

DETAILED DESCRIPTION OF THE DISCLOSURE

Hereinafter, various embodiments of the present invention will be described in detail with reference to the accompanying drawings. However, the present invention is not limited to the exemplary embodiments disclosed below, but can be implemented in various types. Therefore, many other modifications and variations of the present invention are possible, and it is to be understood that within the scope of the disclosed concept, the present invention may be practiced otherwise than as has been specifically described.

Figure 1:
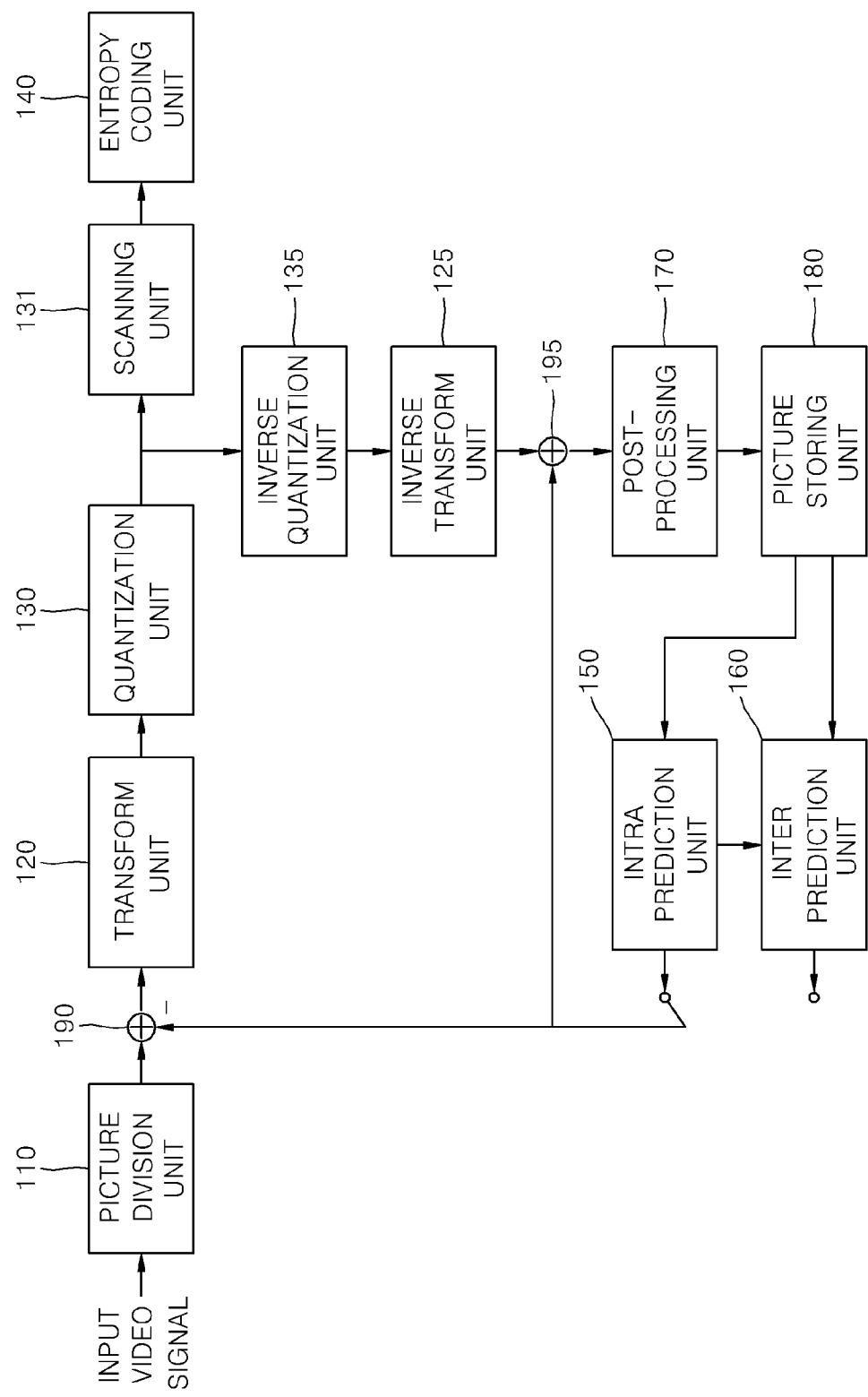
FIG. 1 is a block diagram of a moving picture coding apparatus according to the present invention.

FIG. 1 is a block diagram of a moving picture coding apparatus according to the present invention.

Referring to FIG. 1, a moving picture coding apparatus 100 according to the present invention includes a picture division unit 110, a transform unit 120, a quantization unit 130, a scanning unit 131, an entropy coding unit 140, an intra prediction unit 150, an inter prediction unit 160, an inverse quantization unit 135, an inverse transform unit 125, a post-processing unit 170, a picture storing unit 180, a subtracter 190 and an adder 195.

The picture division unit 110 analyzes an input video signal to divide each LCU of a picture into one or more coding units each of which has a predetermined size, determine prediction mode of each coding unit, and determines size of prediction unit per each coding unit. The picture division unit 110 sends the prediction unit to be encoded to the intra prediction unit 150 or the inter prediction unit 160 according to the prediction mode. Also, the picture division unit 110 sends the prediction units to be encoded to the subtracter 190.

The transform unit 120 transforms residual signals between an original block of a prediction unit and a prediction block generated by the intra prediction unit 150 or the inter prediction unit 160. The residual block may have a size of coding unit. The residual block may be divided into optimal transform units and transformed. A transform matrix type may be adaptively determined according to a prediction mode and an intra prediction mode. The transform unit of the residual signals may be transformed by horizontal and vertical one-dimensional (1D) transform matrices. In inter prediction, one predetermined transform matrix type is applied. In intra prediction, there is a high possibility that the residual signals will have vertical directivity when the intra prediction mode of the current prediction unit is horizontal. Thus, a discrete cosine transform (DCT)-based integer matrix is applied to the vertical direction, and a discrete sine transform (DST) or Karhunen Loève transform (KLT)-based integer matrix is applied to the horizontal direction. When the intra prediction mode is vertical, a DST or KLT-based integer matrix is applied to the vertical direction, and a DCT-based integer matrix is applied to the horizontal direction. Also, in intra prediction, the transform matrix may be adaptively determined according to a size of the transform units.

The quantization unit 130 determines a quantization step size for quantizing transform coefficients of the residual block according to coding units. The quantization step size is determined per coding unit having a size equal to or larger than a predetermined size. The predetermined size may be 8×8 or 16×16. Using the determined quantization step size and a quantization matrix determined according to a prediction mode, the transform coefficients are quantized. The quantization unit 130 uses quantization step sizes of one or more coding units adjacent to the current coding unit to generate a quantization step size predictor of the current coding unit. The quantization unit 130 sequentially retrieves coding units in the following scan order; 1) a left coding unit of the current coding unit, 2) an above coding unit of the current coding unit, and 3) an above left coding unit of the current coding unit. And the quantization unit generates the quantization step size predictor of the current coding unit using one or two valid quantization step sizes. For example, the first valid quantization step size encountered in the scan order may be determined as the quantization step size predictor. An average of the first two valid quantization step size retrieved in the scan order may be determined as the quantization step size predictor when two or more quantization step sizes are valid, and one valid quantization step size is determined as the quantization step size predictor when only one quantization step size is valid. When the quantization step size predictor is determined, a difference between the quantization step size and the quantization step size predictor is transmitted to the entropy coding unit 140.

There may be none of a left coding unit, an above coding unit and an above left coding unit of the current coding unit. On the other hand, there may be a previous coding unit of the current coding unit in coding order. Thus, coding units adjacent to the current coding unit and the previous coding unit may be candidates. In this case, the above scanning order may be changed to the following scan order; 1) the left coding unit of the current coding unit, 2) the above coding unit of the current coding unit, 3) the above left coding unit of the current coding unit and 4) the previous coding unit of the current coding unit. The scan order may vary, or the above left coding unit may be omitted in scan order.

The quantized transform block is provided to the inverse quantization unit 135 and the scanning unit 131.

The scanning unit 131 scans the quantized transform coefficients of the quantized transform block, thereby converting the quantized transform coefficients into 1D quantized transform coefficients. A scan pattern is determined according to the intra prediction mode because the distribution of the quantized transform coefficients depends on the intra prediction mode. The scan pattern may also be determined according to the size of the transform unit. The scan pattern may be determined depending on the directional intra prediction mode. The quantized transform coefficients are scanned in a reverse direction.

When the quantized transform coefficients are into a plurality of subsets, same scan pattern is applied to each subset. The plurality of subsets consist of one main subset and one or more residual subsets. The main subset is located at an upper left side and includes a DC coefficient. The one or more residual subsets cover region other than the main subset.

Zigzag scan may be applied to scan the subsets. The subsets may be scanned beginning with the main subset to the residual subsets in a forward direction, or can be scanned in a reverse direction. A scan pattern for scanning the subsets may be set the same as a scan pattern for scanning the quantized transform coefficients. In this case, the scan pattern for scanning the subsets is determined according to the intra prediction mode. An encoder transmits information capable of indicating a position of the last non-zero quantized coefficient of the transform unit to a decoder. The encoder also transmits information capable of indicating a position of the last non-zero quantized coefficient of each subset to the decoder.

The inverse quantization unit 135 inversely quantizes the quantized transform coefficients. The inverse transform unit 125 restores residual signals of the spatial domain from the inversely quantized transform coefficients. The adder 195 generates a reconstructed block by adding the residual block reconstructed by the inverse transform unit 125 and the prediction block from the intra prediction unit 150 or the inter prediction unit 160.

The post-processing unit 170 performs a deblocking filtering process for removing blocking artifact generated in a reconstructed picture, an adaptive offset application process for complementing a difference between the reconstructed picture and the original image per pixel, and an adaptive loop filter process for complementing a difference between the reconstructed picture and the original image in a coding unit.

The deblocking filtering process may be applied to a boundary between prediction units having a predetermined size or more and between transform units. The predetermined size may be 8×8. The deblocking filtering process includes a step of determining a boundary to be filtered, a step of determining boundary filtering strength to be applied to the boundary, a step of determining whether or not to apply a deblocking filter, and a step of selecting a filter to be applied to the boundary when it is determined to apply the deblocking filter.

Whether or not to apply the deblocking filter is determined according to i) whether or not the boundary filtering strength is greater than 0 and ii) whether or not a value indicating the difference between boundary pixels of P block and Q block is smaller than a first reference value determined according to a quantization parameter.

Two or more filters may exist. When an absolute value of a difference between two pixels adjacent to the block boundary is equal to or larger than a second reference value, a weak filter is selected. The second reference value is determined by the quantization parameter and the boundary filtering strength.

The adaptive offset application process is intended to reduce a difference (distortion) between a pixel subjected to the deblocking filter and the original pixel. A picture or slice may be divided into a plurality of offset regions, and an offset mode may be determined per the offset region. There are four edge offset modes, two band offset modes and an offset non-application mode. According to each offset mode, pixels in each offset region are classified into a predetermined number of classes, and offset corresponding to the classified class is added to the pixel. In the case of an edge offset mode, a class of a current pixel is determined by comparing the current pixel value with pixel values of two or more pixels adjacent to the current pixel.

The adaptive loop filter process may be performed on the basis of a value obtained by comparing an original image and a reconstructed image to which the deblocking filtering process or the adaptive offset application process is applied. An adaptive loop filter (ALF) is detected through one Laplacian activity value on the basis of a 4×4 block. The determined ALF can be applied to all pixels included in a 4×4 block or an 8×8 block. Whether or not to apply an ALF may be determined according to coding units. A size and coefficients of a loop filter may vary according to each coding unit. Information indicating whether ALF is applied to each coding unit, filter coefficient information and filter shape information may be included in slice header and transmitted to the decoder. In the case of a chrominance signal, whether or not to apply the ALF may be determined in picture units. Unlike luminance, the loop filter may have a rectangular shape.

The adaptive loop filter process is performed on the basis of slice. Therefore, the information indicating whether the adaptive loop filter process is applied to a current slice or not is included in a slice header or a picture header. If the adaptive loop filter process is applied to the current slice, the slice header or the picture includes information indicating a horizontal filter length and/or a vertical filter length of luminance components.

The slice header or the picture header may include information indicating the number of filters. If the number of filters is 2 or more, the coefficients of the filter may be encoded using prediction method. Accordingly, the slice header or the picture header may include information indicating whether the coefficients of the filter is encoded using prediction method or not, and the coefficients of the filter when the prediction method is used.

Chrominance components may also be filtered adaptively. The slice header or the picture header may include information whether each chrominance component is filtered or not. To reduce the amount of bits, the information indicating whether the Cr component is filtered and information indicating whether the Cb component is filtered may be coded jointly. A lowest index is assigned to the case that the none of Cr and Cb components are not filtered because the probability that the none of Cr and Cb components are not filtered is high. A highest index is assigned to the case that the both of Cr and Cb components are filtered.

The picture storing unit 180 receives post-processed image from the post-processing unit 170, and stores the image in picture units. A picture may be a frame or a field. The picture storing unit 180 has a buffer (not shown) capable of storing a plurality of pictures.

The inter prediction unit 160 performs motion estimation using one or more reference pictures stored in the picture storing unit 180, and determines one or more reference picture indexes indicating the reference pictures and one or more motion vectors. According to the reference picture index and motion vector, the inter prediction unit 160 extracts a prediction block corresponding to a prediction unit to be encoded from a reference picture selected among a plurality of reference pictures stored in the picture storing unit 180 and outputs the extracted prediction block.

The intra prediction unit 150 performs intra prediction using reconstructed reference pixels in a picture including a current prediction unit. The intra prediction unit 150 receives the current prediction unit to be predictively encoded, selects one of a predetermined number of intra prediction modes, and performs intra prediction. The predetermined number of intra prediction modes depends on a size of the current prediction unit. The intra prediction unit 150 adaptively filters reference pixels to generate the intra prediction block. When some of reference pixels are not available, it is possible to generate the reference pixels at the invalid positions using valid reference pixels.

The entropy coding unit 140 entropy-codes the quantized transform coefficients from the quantization unit 130, intra prediction information received from the intra prediction unit 150, motion information received from the inter prediction unit 160, and so on.

Figure 2:
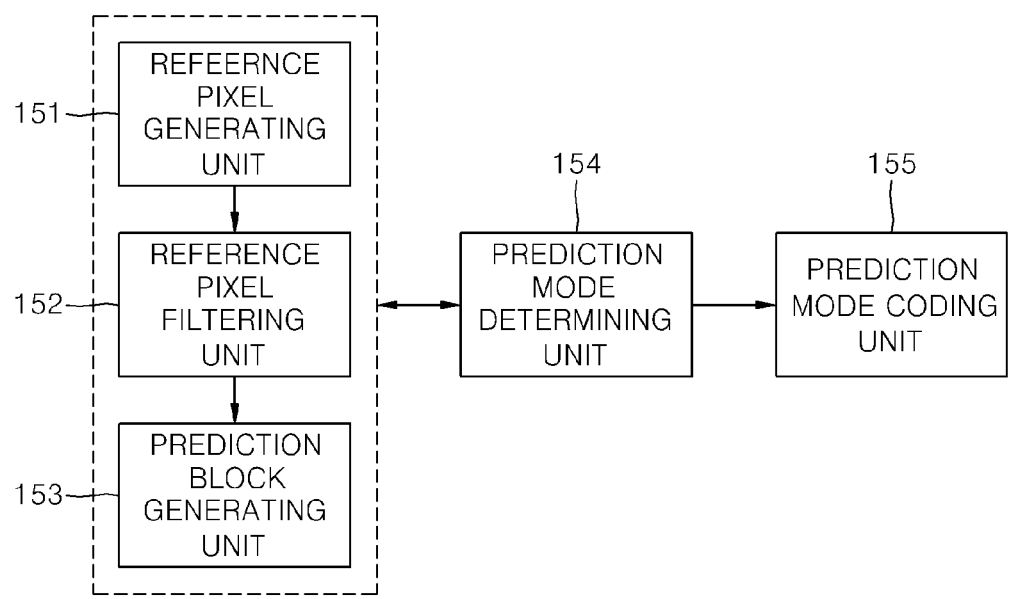
FIG. 2 is a block diagram of an intra prediction unit of a moving picture coding apparatus according to the present invention.

FIG. 2 is a block diagram of the intra prediction unit 150 of a moving picture coding unit 100 according to the present invention.

Referring to FIG. 2, the intra prediction unit 150 includes a reference pixel generating unit 151, a reference pixel filtering unit 152, a prediction block generating unit 153, a prediction mode determining unit 154 and a prediction mode coding unit 155.

The reference pixel generating unit 151 determines that it is necessary to generate reference pixels for intra prediction, and generates reference pixels if it is necessary to generate the reference pixels.

Figure 3:
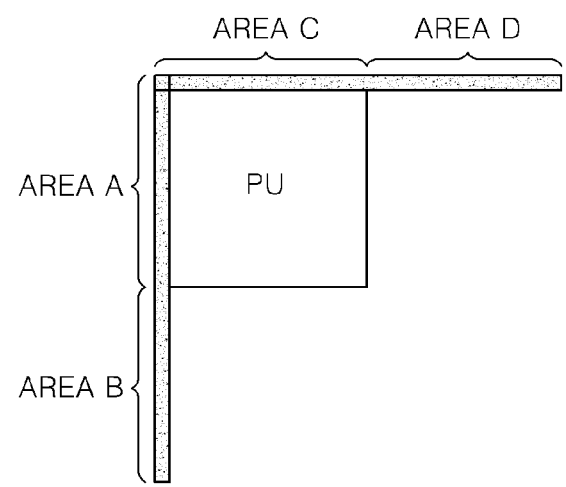
FIG. 3 is a conceptual diagram showing positions of reference pixels used for intra prediction according to the present invention.

FIG. 3 is a conceptual diagram showing positions of reference pixels used for intra prediction according to the present invention. As shown in FIG. 3, the reference pixels of the current prediction unit used for intra prediction consist of above reference pixels, left reference pixels and a corner reference pixel. The above reference pixels cover areas C and D, and the left reference pixels cover areas A and B. The corner reference pixel is located at (x=−1, y=−1).

The reference pixel generating unit 151 determines whether the reference pixels are available or not. If one or more reference pixels are not available, the reference pixel generating unit 151 generates the reference pixels using available reference pixel.

When the current prediction unit is located at the upper boundary of a picture or a slice, the above reference pixels covering areas C and D do not exist. When the current prediction unit is located at the left boundary of a picture or a slice, the left reference pixels covering areas A and B do not exist. In those cases, reference pixels are generated by copying the value of an available pixel closest to the unavailable pixel. For example, when the current prediction unit is located at the upper boundary of a picture or a slice, the above reference pixels can be generated by copying an uppermost left reference pixel. When the current prediction unit is located at the left boundary of a picture or a slice, the left reference pixels can be generated by copying a leftmost above reference pixel.

When some of the left reference pixels or the above reference pixels are not available, the reference pixels are generated as follows.

When the reference pixels covering area C is be available, the reference pixels covering area D may not be available. For example, when the current prediction unit is located at the right boundary of a slice or a largest coding unit, the reference pixels covering area D are not available. The reference pixels covering area D are generated using one or more available above reference pixels. The reference pixels covering the area D are generated by copying a rightmost pixel of available above reference pixels or using two or more available above reference pixels.

When the reference pixels covering area A is be available, the reference pixels covering area B may not be available. For example, when the current prediction unit is located at the below boundary of a slice or a largest coding unit, the reference pixels covering area B are not available. The reference pixels covering area B are generated using one or more available left reference pixels. The reference pixels covering the area B are generated by copying a lowest pixel of available left reference pixels or using two or more available left reference pixels.

As described above, if the unavailable reference pixel exists in only one direction from the available pixels, the reference pixel is generated by copying the value of an available pixel closest to the unavailable pixel. Alternatively, the reference pixels may be generated using two or more available pixels closest to the unavailable pixel.

If the unavailable reference pixel exists between the available pixels, the reference pixel is generated using two available reference pixels closest to the unavailable pixel in both sides. For example, when the current block is located at the upper boundary of a slice and the above right block of the current block is available, the reference pixels covering area C are not available, but the reference pixels covering areas A and D are available. The reference pixel is generated by averaging the two available reference pixels. But, linear interpolation may be used to generate the reference when the area covered by the unavailable reference pixels is large.

The reference pixel filtering unit 152 filters adaptively reference pixels of the current prediction unit.

Figure 4:
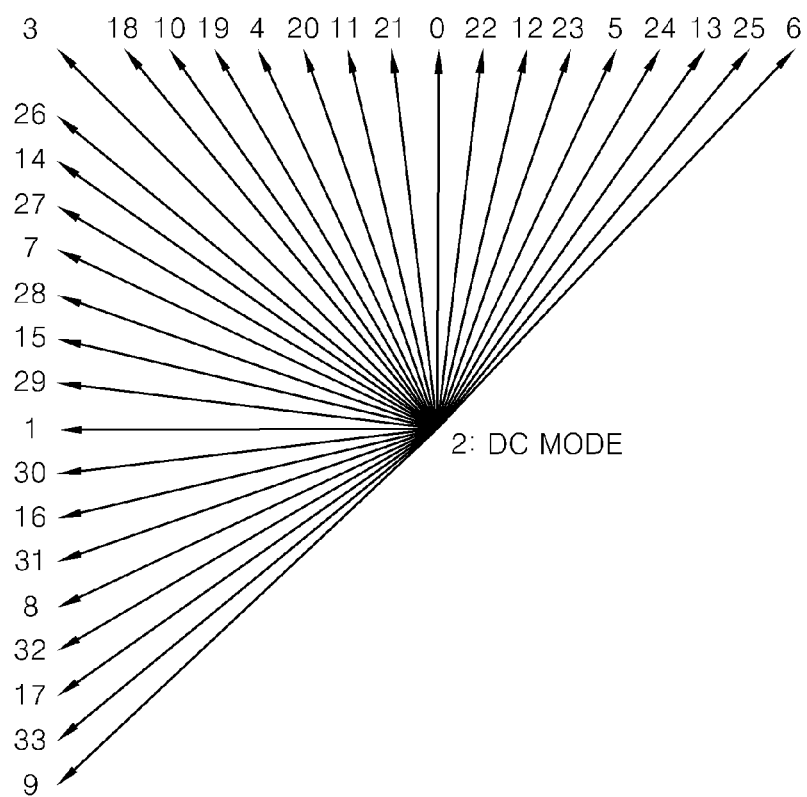
FIG. 4 is a conceptual diagram illustrating directional intra prediction modes according to the present invention.

FIG. 4 is a conceptual diagram illustrating directional intra prediction modes according to the present invention. Referring to the FIG. 4, the operation of the reference pixel filtering unit 152 is described as follows.

The reference pixel filtering unit 152 filters reference pixels adaptively according to the intra prediction mode and position of the reference pixel.

In the vertical mode (mode 0), the horizontal mode (mode 1) and the DC mode (mode 2), the reference pixels are not filtered. But, in directional intra prediction modes other than the mode 0 and 1, the reference pixels are adaptively filtered. The rightmost pixel of the above reference pixels located at (x=2N−1, y=−1) and the lowest pixel of the left reference pixels located at (x=−1, y=2N−1) are not filtered. The other reference pixels are filtered using two adjacent reference pixels.

Low-pass filter is applied to smooth the differences between adjacent reference pixels. The low-pass filter may be a 3-tap filter [1, 2, 1] or a 5-tap filter [1, 2, 4, 2, 1].

The application of the low-pass filter is determined by a size of the current prediction block and intra prediction mode.

A filter is adaptively applied to the reference pixels in the directional intra prediction modes 3, 6 and 9 having a direction of 45° with reference to the horizontal or vertical direction according to the size of the prediction block. If the size is smaller than a predetermined size, a first filter is applied. If the size is equal to or larger than the predetermined size, a second filter stronger than the first filter may be applied. The predetermined size may be 16×16.

In directional intra prediction modes existing between the intra prediction mode 3, 6 or 9 and the horizontal or vertical intra prediction mode, the filter can be adaptively applied to reference pixels according to the size of the prediction block. The filter may be applied in a predetermined number of intra prediction modes closest to the mode 3, 6 or 9. The predetermined number may be increase as the size of the prediction block increases. For example, the filter is applied in a first number of intra prediction modes closest to mode 3, 6 or 9 for 8×8 block, in a second number of intra prediction modes closest to mode 3, 6 or 9 for 16×16 block, and in a third number of intra prediction modes closet to mode 3, 6 or 9 for 32×32 block. The first number is equal to or smaller than the second number, and the second number is equal to or smaller than the third number.

The prediction block generating unit 153 generates a prediction block corresponding to the intra prediction mode.

In the DC mode, a large difference between a reference pixel and a prediction pixel adjacent to the reference pixel may arise if the prediction pixel adjacent to the reference pixel is generated by averaging a plurality of reference pixels. Therefore, the prediction pixels adjacent to above reference pixel or left reference pixel are generated by filtering the averaged value using the adjacent reference pixel. For example, a prediction pixel located at the upper left corner is generated by filtering the averaged value using two adjacent reference pixels. The other prediction pixels adjacent to a reference pixel are generated by filtering the averaged value using a reference pixel adjacent to the prediction pixel.

In the planar mode, the prediction pixels are generated using a corner reference pixel, left reference pixels and above reference pixels. A prediction pixel located at (a, b) is generated using a corner reference pixel located at (x=−1, y=−1), an above reference pixel located at (x=a, y=−1) and a left reference pixel located at (x=−1, y=b). The prediction pixels are not filtered by reference pixel.

When prediction pixels are generated by copying a corresponding above reference pixel in the vertical mode (mode 0), a correlation between a left reference pixel and a prediction pixel adjacent to the left reference pixel decreases as the position of the prediction pixel goes down. When prediction pixels are generated by copying a corresponding left reference pixel in the horizontal mode (mode 1), a correlation between an above reference pixel and a prediction pixel adjacent to the above reference pixel decreases as the position of the prediction pixel goes right. Therefore, in the vertical mode, the prediction pixel adjacent to a left reference pixel is generated by filtering the corresponding above reference pixel using one or more reference pixels not used when the prediction block is generated by copying the corresponding above reference pixel. In the horizontal mode, the prediction pixels adjacent to an above reference pixel is generated by filtering the corresponding left reference pixel using one or more reference pixels not used when the prediction block is generated by copying the corresponding left reference pixel.

In the directional intra prediction modes existing to between modes 0 and 6, and mode 6, when prediction pixels are generated using only above reference pixels, the difference between a left reference pixel and a prediction pixel adjacent to the left reference pixel increases as the position of the prediction pixel goes down.

In the directional intra prediction modes existing to between modes 1 and 9, and mode 9, when prediction pixels are generated using only left reference pixels, the difference between an above reference pixel and a prediction pixel adjacent to the above reference pixel increases as the position of the prediction pixel goes right.

Therefore, in the directional intra prediction mode, some prediction pixels of a prediction block may be generated using above and left reference pixels as follows.

In the mode 6, the prediction block is generated using above reference pixels and left prediction pixels adjacent to a reference pixel are filtered. The area covered by left prediction pixels to be filtered may vary according to prediction size. That is, the line number or ratio of left prediction pixel to be filtered may vary according to the prediction size. The line number may increase or remain the same or the ratio may decrease as the prediction size increases.

For example, all prediction pixels of the first left line are filtered for 4×4. All prediction pixels of the first left line and some prediction pixels of the second line are filtered for 8×8. The some prediction pixels may be located at (x=1, y=4, . . . , 7). All prediction pixels of the first left line, a first number of prediction pixels of the second line and a second number of prediction pixels of the third line are filtered for 16×16. The first number of prediction pixels may be located at (x=1, y=4, . . . , 7) and the second number of prediction pixels may be located at (x=2, y=8, . . . , 15). All prediction pixels of the first left line, a first number of prediction pixels of the second line, a second number of prediction pixels of the third line and a third number of prediction pixels of the fourth line are filtered for 16×16. The third number of prediction pixels may be located at (x=3, y=16, . . . , 31).

In a first number of intra prediction modes closest to the mode 6, prediction pixels may be filtered using the same method as in the mode 6. A number of prediction pixels to be filtered may decrease as a direction of the intra prediction mode goes far from the direction of the mode 6. In a second number of intra prediction modes existing between mode 0 and 6 and closest to the mode 0, prediction pixels may be filtered using the same method as in the mode 0.

In the mode 9, prediction pixels may be filtered using the same method as in the mode 6. In the intra prediction mode existing between modes 1 and 9, prediction pixels may be filtered using the same method as in the intra prediction mode existing between modes 0 and 6.

The intra prediction mode determining unit 154 determines the intra prediction mode of the current prediction unit using the reference pixels. The intra prediction mode determining unit 154 selects one intra prediction mode in which the amount of coding bits of a residual block is minimized as the intra prediction mode of the current prediction unit.

The intra prediction mode coding unit 155 encodes the intra prediction mode of the current prediction unit determined by the intra prediction mode determining unit 154. The intra prediction mode coding unit 155 may be integrated into the intra prediction unit 150 or into the entropy coding unit 140

The intra prediction mode coding unit 155 encodes the intra prediction mode of the current prediction unit using intra prediction modes of the prediction units adjacent to the current prediction unit. The intra prediction mode coding unit 155 divide all intra prediction modes into a plurality intra prediction mode group, encodes information indicating the intra prediction mode group including the intra prediction mode of the current prediction unit, and mode index corresponding to the intra prediction mode of the current coding unit in the intra prediction mode group. The number of the intra prediction mode groups is 2 or 3.

When the number of the intra prediction mode groups is 2, the operation of the intra prediction mode coding unit 155 is as follows.

First, the intra prediction modes of the prediction units adjacent to the current prediction unit are derived. The prediction units may be a left prediction unit and an above prediction unit. When there exist a plurality of above prediction units of the current prediction unit, the plurality of above prediction units are scanned in a predetermined direction (e.g., from right to left) to determine the intra prediction mode of a first valid prediction unit as an above intra prediction mode. Also, when there exist a plurality of left prediction units of the current prediction unit, the plurality of left prediction units are scanned in a predetermined direction (e.g., from bottom to top) to determine the intra prediction mode of a first valid prediction unit as a left intra prediction mode. Alternatively, among a plurality of valid prediction units, the intra prediction mode of a valid prediction unit having the lowest intra prediction mode number may be set as an above intra prediction mode.

Next, the derived intra prediction mode may be converted into one of the permissible modes when the derived intra prediction mode number is equal to or greater than the number of intra prediction modes permissible for the current prediction unit.

Next, a first intra prediction mode group is constructed using the derived or converted intra prediction mode. The derived or converted intra prediction modes and one or more intra prediction mode candidates determined in a predetermined order by the derived or converted intra prediction modes are used to construct the first intra prediction mode group. When the derived or converted intra prediction mode is directional mode, the one or more intra prediction mode candidates may be directional intra prediction mode closest to the derived or converted intra prediction mode.

Next, it is determined whether the intra prediction mode of the current prediction unit belongs to the first intra prediction mode group or not.

When the intra prediction mode of the current prediction unit belongs to the first intra prediction mode group, information indicating the first intra prediction mode group and an index corresponding to the intra prediction mode of the current prediction unit in the first intra prediction mode group are encoded.

But, when the intra prediction mode of the current prediction unit does not belong to the first intra prediction mode group, information indicating a second intra prediction mode group and an index corresponding to the intra prediction mode of the current coding unit in the second intra prediction mode group are encoded. The second intra prediction mode group includes all intra prediction modes other than the intra prediction modes belonging to the first intra prediction mode group.

When none of the above intra prediction mode and the left intra prediction mode is available, one or more intra prediction modes are added to the first intra prediction mode group. For example, DC mode or planar mode may be added when one intra prediction mode is added. DC mode and planar or vertical mode may be added when two intra prediction modes are added. DC mode, planar mode and one of the vertical mode and horizontal mode may be added when three intra prediction modes are added.

When one of the above intra prediction mode and the left intra prediction mode is available or when the above intra prediction mode and the left intra prediction mode are same, one or two intra prediction modes may be added to the first intra prediction mode group. For example, DC mode or planar mode may be added when one intra prediction mode is added. When two intra prediction modes are added, the intra prediction modes to be added vary according to whether the available intra prediction mode is a directional intra prediction mode or not. If the available intra prediction mode is one of non-directional intra prediction modes (that is, DC mode and planar mode), a vertical mode and a horizontal mode may be added or the other directional intra prediction mode and a vertical mode may be added. If the available intra prediction mode is a directional intra prediction mode, two intra prediction modes adjacent to the directional intra prediction mode may be added. But, if there exist the adjacent intra prediction mode in only one side of the available intra prediction mode (that is, the available intra prediction mode is mode 6 or 9), the one adjacent intra prediction mode (mode 25 or 33) and one of DC mode and planar mode may be added.

When the intra prediction mode of the current prediction unit belongs to the second intra prediction mode group, the index corresponds to a reordered number of the intra prediction mode of the current coding unit in the second intra prediction mode group.

The number of the intra prediction mode groups may be 3. When the number of the intra prediction mode groups is 3, if the intra prediction mode of the current prediction unit does not belong to the first intra prediction mode group, it is determined whether the intra prediction mode of the current prediction unit belongs to the second intra prediction mode group. If the intra prediction mode of the current prediction unit belongs to the second intra prediction mode group, information indicating the second intra prediction mode group and an index corresponding to the intra prediction mode of the current coding unit in the second intra prediction mode group are encoded. If the intra prediction mode of the current prediction unit does not belong to the second intra prediction mode group, information indicating the third intra prediction mode group and an index corresponding to the intra prediction mode of the current coding unit in the third intra prediction mode group are encoded. The second intra prediction mode group is generated based on the left and above intra prediction modes of the current prediction unit.

Alternatively, the intra prediction mode of the current prediction mode may be encoded as follows. First, it is determined whether the intra prediction mode of the current prediction unit is equal to one of the intra prediction mode of previous intra prediction units. If the intra prediction mode of the current prediction unit is equal to one of the intra prediction mode of previous intra prediction units, a pred_flag is set to 1 and the intra prediction mode is encoded using the available left or above intra prediction mode. Otherwise, pred_flag is set to 0 and an index indicating the ordered number of the intra prediction mode of the current coding unit among intra prediction modes other than the left and above intra prediction modes is coded.

Meanwhile, intra prediction modes of chrominance component may includes a mode using corresponding intra prediction mode of luminance component. A flag indicating whether the mode using corresponding intra prediction mode of luminance component is used or not may be included in a sequence parameter set (SPS), a picture parameter set (PPS) or a slice header. The number of intra prediction modes of chrominance component may vary according to a size of the prediction block. The intra prediction modes of chrominance component may be encoded using intra prediction modes of adjacent chrominance coding units.

The prediction block transmitting unit 156 transmits the prediction block generated using the intra prediction mode to the subtracter 190.

Figure 5:
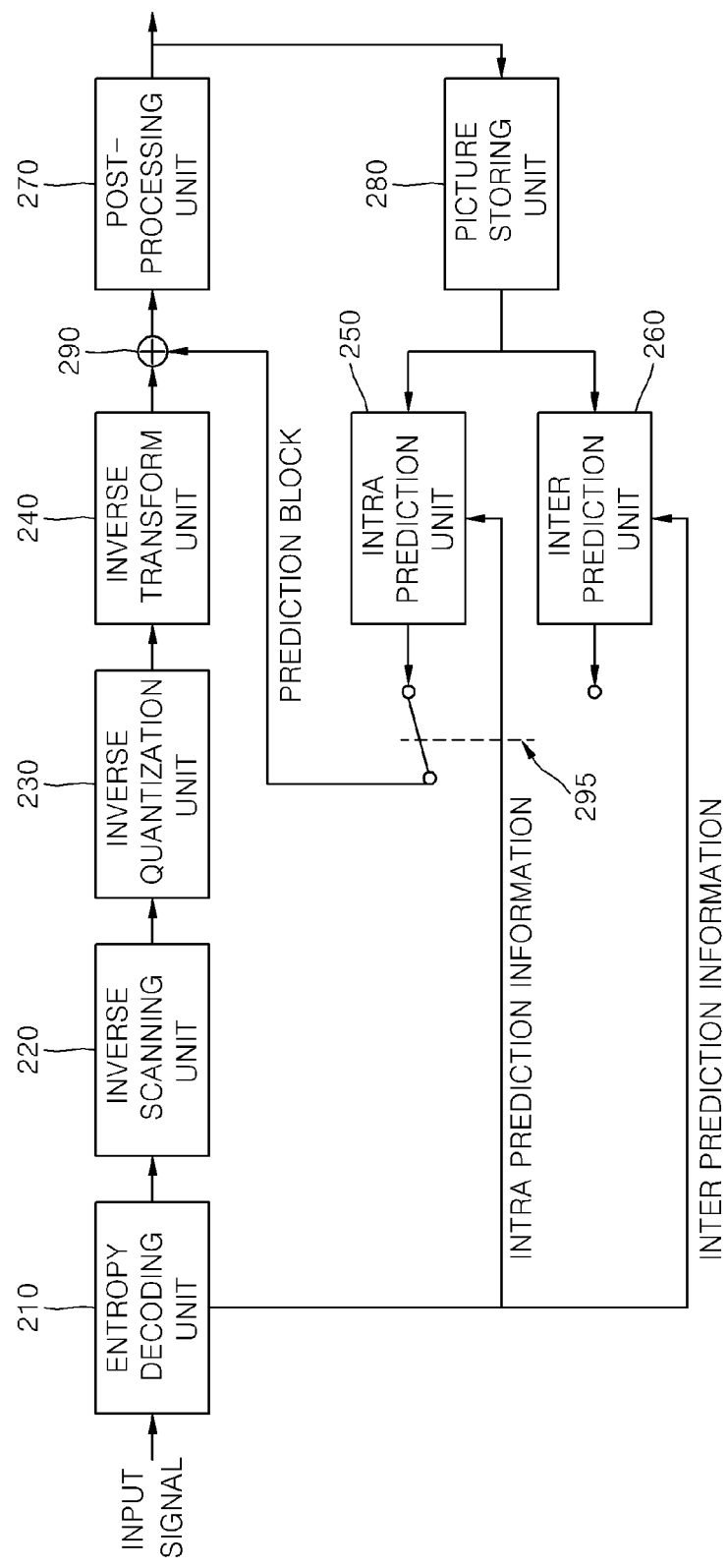
FIG. 5 is a block diagram of a moving picture decoding apparatus according to the present invention.

FIG. 5 is a block diagram of a moving picture decoding apparatus according to the present invention.

The moving picture decoding apparatus according to the present invention includes an entropy decoding unit 210, an inverse scanning unit 220, an inverse quantization unit 230, an inverse transform unit 240, an intra prediction unit 250, an inter prediction unit 260, a post-processing unit 270, a picture storing unit 280, an adder 290 and a switch 295.

The entropy decoding unit 210 extracts intra prediction information, inter prediction information and quantized coefficients information from a received bit stream. The entropy decoding unit 210 transmits the inter prediction information to the inter prediction unit 260, the intra prediction information to the intra prediction unit 250 and the quantized coefficients information to the inverse scanning unit 220.

The inverse scanning unit 220 converts the quantized coefficients information into two dimensional quantized transform block. One of a plurality of inverse scan patterns is selected for the conversion. The inverse scan pattern is selected based on the intra prediction mode. If a size of a transform unit to be decoded is larger than the predetermined reference size, the quantized transform coefficients of each subset are inversely scanned according to the selected inverse scan pattern to generate a plurality of subsets and a quantized transform block having a size of the transform unit is generated using the plurality of subsets. If the size of a transform unit to be decoded is equal to the predetermined reference size, the quantized transform coefficients of the quantized transform block are inversely scanned according to the selected inverse scan pattern to generate the quantized transform block having a size of the transform unit. The plurality of subsets consist of one main subset and one or more residual subsets. The main subset is located at an upper left side and includes a DC coefficient, and the one or more residual subsets cover region other than the main subset. A scan pattern to be applied to the subsets may be a zigzag scan. The subsets may be inversely scanned beginning with the main subset to the residual subsets in a forward direction, or can be scanned in the reverse direction. A scan pattern for scanning the subsets may be set the same as a scan pattern for scanning the quantized transform coefficients. The inverse scanning unit 220 performs inverse scanning procedure using information indicating a position of the last non-zero quantized coefficient of the transform unit.

The inverse quantization unit 230 determines a quantization step size predictor of a current coding unit. The operation of determining the quantization step size predictor is same as the operation of the quantization unit 130 of FIG. 1. The inverse quantization unit adds the determined quantization step size predictor and a received residual quantization step size to generate a quantization step size of the current coding unit. The inverse quantization unit 230 restores inverse quantized coefficients using a quantization matrix determined by the quantization step size. The quantization matrix varies according to the size of the current block or the quantization matrix varies for a block according to at least one of the prediction mode and the intra prediction mode.

The inverse transform unit 240 inversely transforms the inverse quantized block to restore a residual block. The inverse transform matrix to be applied to the inverse quantized block is adaptively determined according to the prediction mode and the intra prediction mode. The determination procedure of the inverse transform matrix is the same as the procedure in the transform unit 120 of FIG. 1.

The adder 290 adds the restored residual block and a prediction block generated by the intra prediction unit 250 or the inter prediction unit 260 to generate a reconstructed block.

The intra prediction unit 250 restores the intra prediction mode of the current block based on the received intra prediction information, and generates a prediction block according to the restored intra prediction mode.

The inter prediction unit 260 restores reference picture indexes and motion vectors based on the received inter prediction information, and generates a prediction block using the reference picture indexes and the motion vectors. When the motion vector does not indicate a pixel position, the prediction block is generated using an interpolation filter.

The post-processing unit 270 operates the same as the post-processing unit 160 of FIG. 1.

Figure 6:
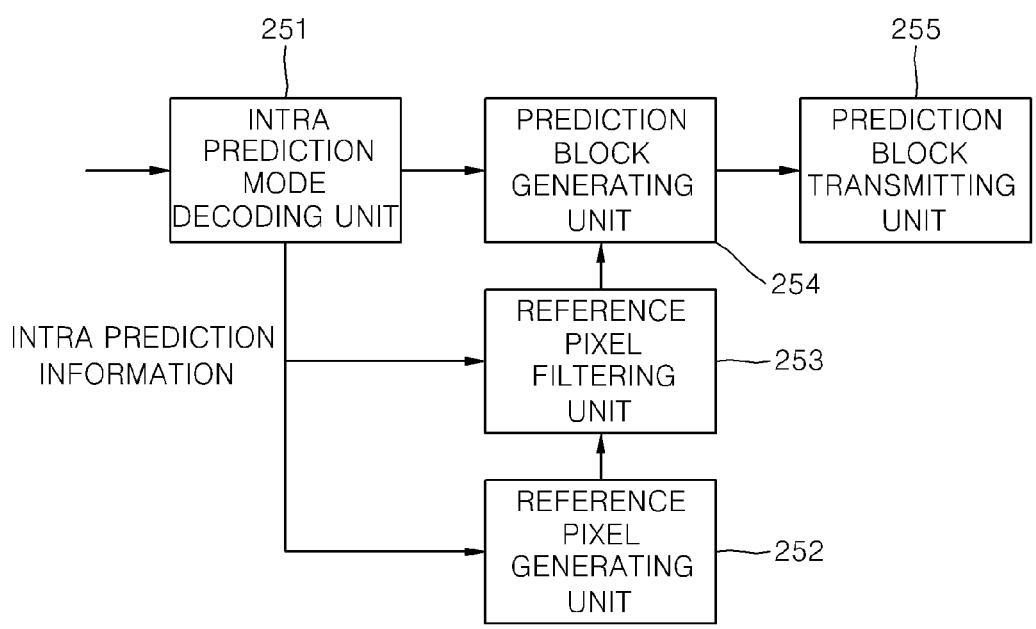
FIG. 6 is a block diagram of an intra prediction unit of a moving picture decoding apparatus according to the present invention.

FIG. 6 is a block diagram of the intra prediction unit 250 of a moving picture decoding apparatus 200 according to the present invention.

The intra prediction unit 250 according to the present invention includes a intra prediction mode decoding unit 251, a reference pixel generating unit 252, a reference pixel filtering unit 253, a prediction block generating unit 254 and a prediction block transmitting unit 255.

The intra prediction mode decoding unit 251 receives the intra prediction information from the entropy decoding unit 210 and restores the intra prediction mode of the current prediction unit using the intra prediction information. The intra prediction information includes information indicating the intra prediction mode group and the intra prediction mode index.

The intra prediction mode decoding unit 251 derives intra prediction modes of the prediction units adjacent to the current prediction unit. The intra prediction mode may be the intra prediction mode of a left intra prediction unit and an above intra prediction unit. When there exist a plurality of above prediction units of the current prediction unit, the plurality of above prediction units are scanned in a predetermined direction (e.g., from right to left) to determine the intra prediction mode of a first valid prediction unit as an above intra prediction mode. Also, when there exist a plurality of left prediction units of the current prediction unit, the plurality of left prediction units are scanned in a predetermined direction (e.g., from bottom to top) to determine the intra prediction mode of a first valid prediction unit as a left intra prediction mode. Alternatively, among a plurality of valid prediction units, the intra prediction mode of a valid prediction unit having the lowest intra prediction mode number may be set as an above intra prediction mode.

The above intra prediction mode or the left intra prediction mode is converted into one of the permissible modes when the above intra prediction mode number or the left intra prediction mode number is equal to or greater than the number of intra prediction modes permissible for the current prediction unit.

A first intra prediction mode group is constructed using the derived or converted intra prediction mode. The derived or converted intra prediction modes and one or more intra prediction mode candidates determined in a predetermined order by the derived or converted intra prediction modes are used to construct the first intra prediction mode group. When the derived or converted intra prediction mode is directional mode, the one or more intra prediction mode candidates may be directional intra prediction mode closest to the derived or converted intra prediction mode.

The intra prediction mode decoding unit 251 determines whether the information indicating the intra prediction mode group indicates the first intra prediction mode group or not.

If the information indicating the intra prediction mode group indicates the first intra prediction mode group, the intra prediction mode of the first intra prediction mode group indicated by the received intra prediction mode index is set as the intra prediction mode of the current prediction unit.

If the information indicating the intra prediction mode group indicates the second intra prediction mode group, the intra prediction mode of the second intra prediction mode group indicated by the received intra prediction mode index is set as the intra prediction mode of the current prediction unit. The second intra prediction mode group includes all intra prediction modes other than the intra prediction modes belonging to the first intra prediction mode group. The intra prediction modes of the second intra prediction mode may be reordered with reference to the intra prediction mode index. The current intra prediction mode of the second intra prediction mode may be reordered based on the intra prediction mode index and the left and above intra prediction modes.

When none of the above intra prediction mode and the left intra prediction mode is available, one or more intra prediction modes are added to the first intra prediction mode group. For example, DC mode or planar mode may be added when one intra prediction mode is added. DC mode and planar or vertical mode may be added when two intra prediction modes are added. DC mode, planar mode, and one of the vertical mode and horizontal mode may be added when three intra prediction modes are added.

When one of the above intra prediction mode and the left intra prediction mode is available or when the above intra prediction mode and the left intra prediction mode are same, one or two intra prediction modes may be added to the first intra prediction mode group. For example, DC mode or planar mode may be added when one intra prediction mode is added. When two intra prediction modes are added, the intra prediction modes to be added vary according to whether the available intra prediction mode is a directional intra prediction mode or not. If the available intra prediction mode is one of non-directional intra prediction modes (that is, DC mode or planar mode), a vertical mode and a horizontal mode may be added or the other non-directional intra prediction mode (that is, planar mode or DC mode) and a vertical mode may be added. If the available intra prediction mode is a directional intra prediction mode, two intra prediction modes adjacent to the directional intra prediction mode may be added. But, if there exist the adjacent intra prediction mode in only one side of the available intra prediction mode (that is, the available intra prediction mode is mode 6 or 9), the adjacent intra prediction mode (mode 25 or 33) and one of DC mode and planar mode may be added.

Alternatively, the intra prediction mode of the current prediction mode may be decoded as follows. First, a pred_flag indicating whether the intra prediction mode of the current prediction unit is equal to one of the intra prediction modes of previous intra prediction units is parsed. If the pred_flag is 1, the intra prediction mode of the current prediction unit is determined using available left and above intra prediction modes. If the pred_flag is 0, the intra prediction mode of the current prediction unit is determined using rem_pred_mode. The rem_pred_mode indicates the order of the current intra prediction mode among all available intra predictions mode other than the left and above intra prediction modes.

The reference pixel generating unit 252 generates reference pixels using the same method as described in the reference pixel generating unit 151 of the coding apparatus 100. But, the reference pixel generating unit 252 may generate reference pixels only when the reference pixels used for generating a prediction block and determined by the intra prediction mode are not available.

The reference pixel filtering unit 253 adaptively filters the reference pixels based on the intra prediction mode and a size of the prediction block. The filtering condition and method are same as those of the reference pixel filtering unit 152 of the coding apparatus 100.

The prediction block generating unit 254 generates a prediction block using the same method as used in the prediction block generating unit 154 of the coding apparatus 100.

The prediction block transmitting unit 255 transmits the prediction block received from the prediction block generator 254 to the adder 290.

Figure 7:
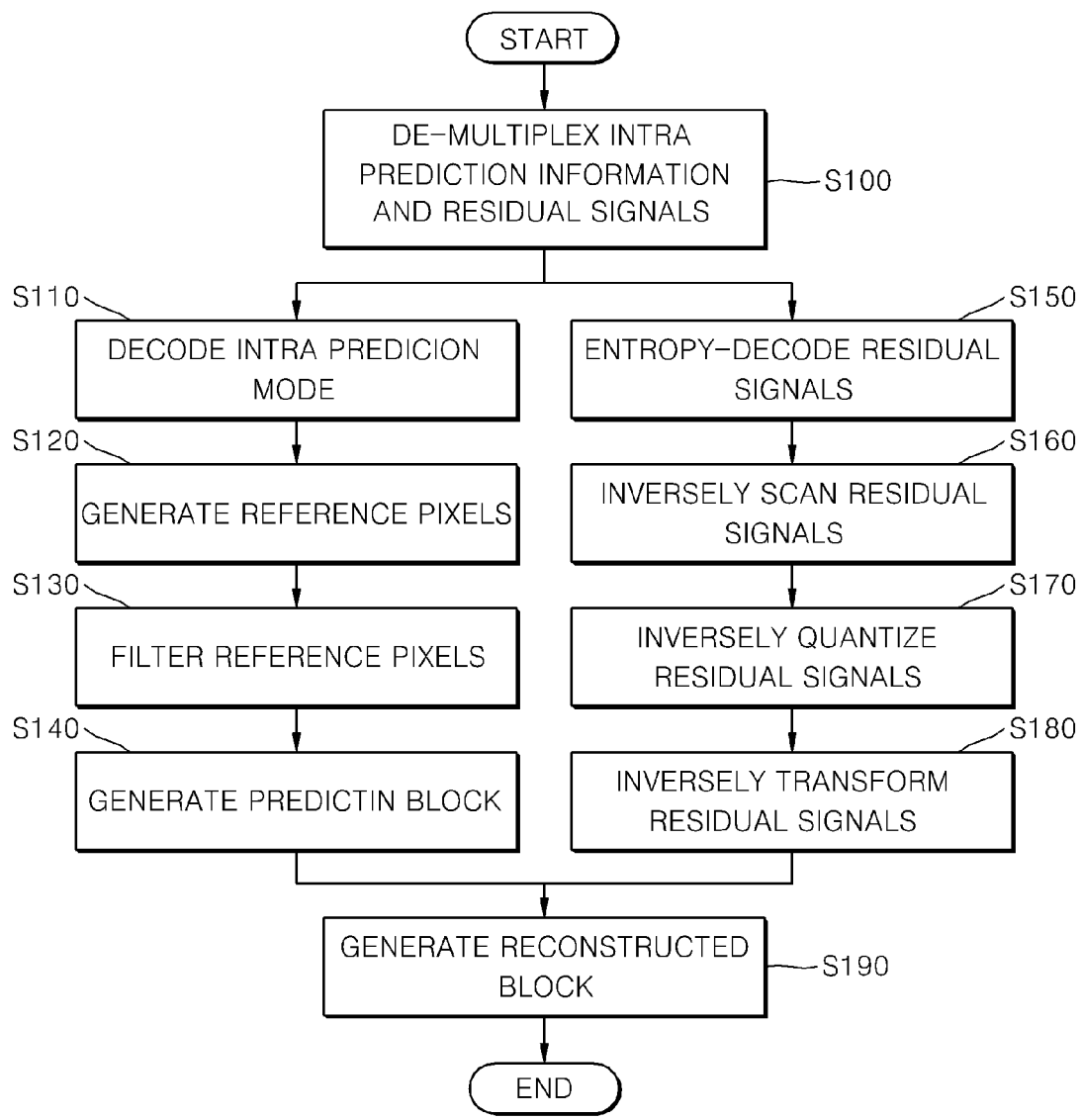
FIG. 7 is a flow chart illustrating a decoding procedure in intra prediction mode according to the present invention.

FIG. 7 is a flow chart illustrating a decoding procedure in intra prediction mode according to the present invention.

First, intra prediction information and residual signals are de-multiplexed from a received bit stream (S100). The step S100 is performed on a coding unit. The intra prediction information is extracted from a prediction unit syntax in the coding unit syntax. The residual signals are extracted from a transform unit syntax in the coding unit syntax.

The intra prediction mode of a current prediction unit is restored using the intra prediction information (S110). The intra prediction information includes the intra prediction mode group indicator (perd_mode) and the intra prediction mode index. If the intra prediction information does not include the intra prediction mode index, the intra prediction information is set to 0. The intra prediction mode group indicator indicates the intra prediction mode group which the intra prediction mode of the current prediction unit belongs to. If the number of the intra prediction mode groups is 2, the intra prediction mode group indicator is a flag of one bit. The number of the intra prediction mode groups may be 2 or 3.

Figure 8:
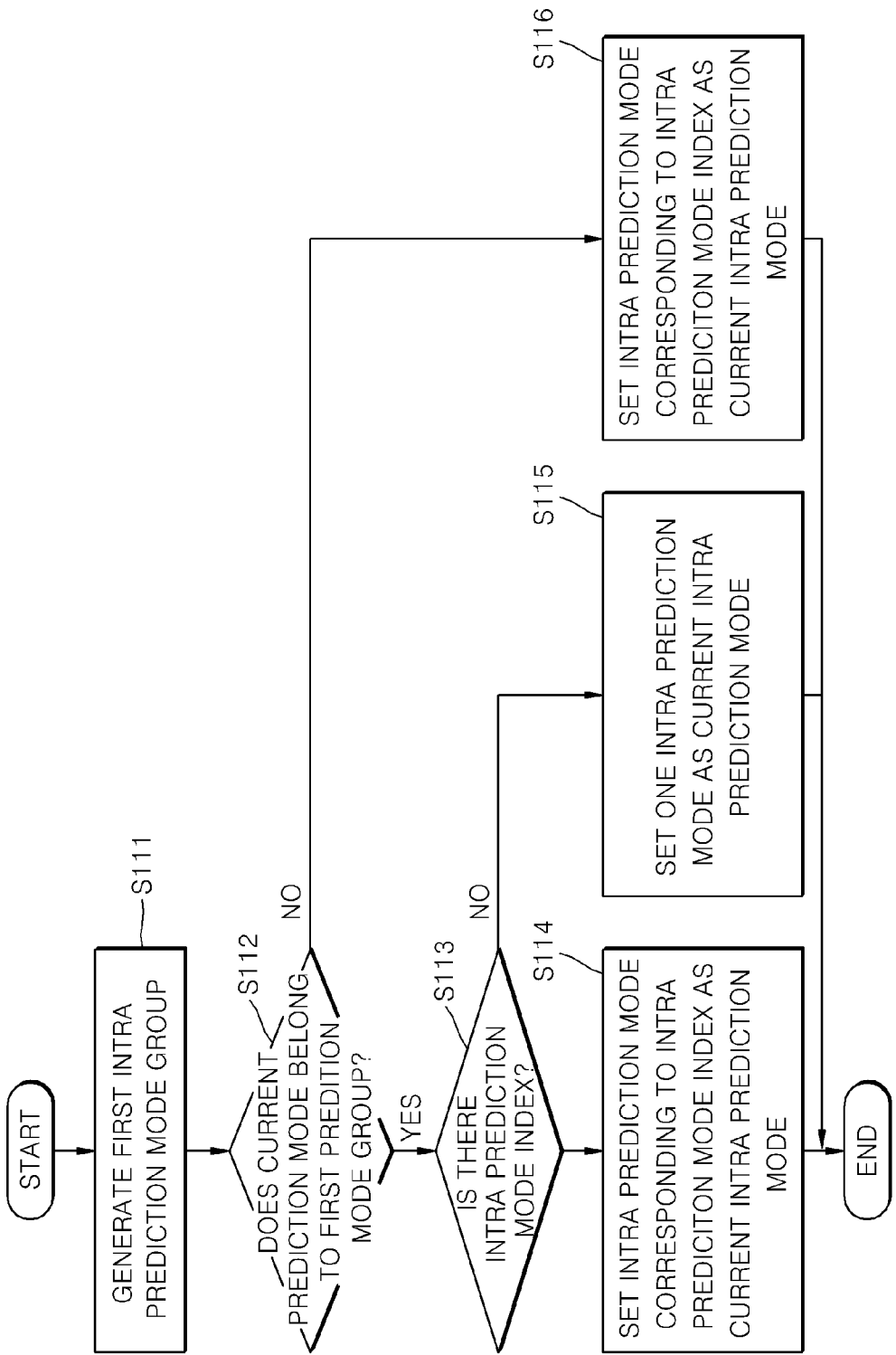
FIG. 8 is a flow chart illustrating a procedure for restoring intra prediction mode according to the present invention.

FIG. 8 is a flow chart illustrating a procedure for restoring intra prediction mode according to the present invention. The number of intra prediction modes belonging to the first intra prediction mode group varies. The number of the intra prediction mode groups is 2.

First, a first intra prediction mode group is constructed using intra prediction modes of the prediction units adjacent to the current prediction unit (S111).

For example, the first intra prediction mode group is comprised of valid intra prediction modes of the above and left intra prediction units of the current prediction unit. If both of the intra prediction modes of the above and left intra prediction units are unavailable, DC mode or planar mode may be added to the first intra prediction mode group. The first intra prediction mode group may include one additional intra prediction mode which is a first valid intra prediction mode encountered when retrieving a right above intra prediction mode, a left below intra prediction mode, a left above intra prediction mode of the current prediction unit.

When there exist a plurality of above prediction units of the current prediction unit, the plurality of above prediction units are scanned in a predetermined direction (e.g., from right to left) to determine the intra prediction mode of a first valid prediction unit as an above intra prediction mode. Also, when there exist a plurality of left prediction units of the current prediction unit, the plurality of left prediction units are scanned in a predetermined direction (e.g., from bottom to top) to determine the intra prediction mode of a first valid prediction unit as a left intra prediction mode.

The derived intra prediction mode may be converted into one of the permissible modes when the derived intra prediction mode number is equal to or greater than the number of intra prediction modes permissible for the current prediction unit.

It is determined whether the intra prediction mode of the current prediction unit belongs to the first intra prediction mode group or not based on the intra prediction mode group indicator (S112).

If the intra prediction mode of the current prediction unit belongs to the first intra prediction mode group, it is determined whether the intra prediction mode index exists or not (S113).

If the intra prediction mode index exists, the intra prediction mode of the first intra prediction mode group corresponding to the intra prediction mode index is determined as the intra prediction mode of the current prediction unit (S114).

If the intra prediction mode index does not exist, the intra prediction mode index is set to 0 and the intra prediction mode of the first intra prediction mode group corresponding to the intra prediction mode index 0 is determined as the intra prediction mode of the current prediction unit (S115).

If the intra prediction mode of the current prediction unit does not belong to the first intra prediction mode group, the intra prediction mode of the second intra prediction mode group corresponding to the intra prediction mode index is determined as the intra prediction mode of the current prediction unit (S116). The second intra prediction mode group includes all intra prediction modes other than the intra prediction modes belonging to the first intra prediction mode group. The intra prediction mode index is assigned in the order of the mode number of the intra prediction mode of the second intra prediction mode group.

Figure 9:
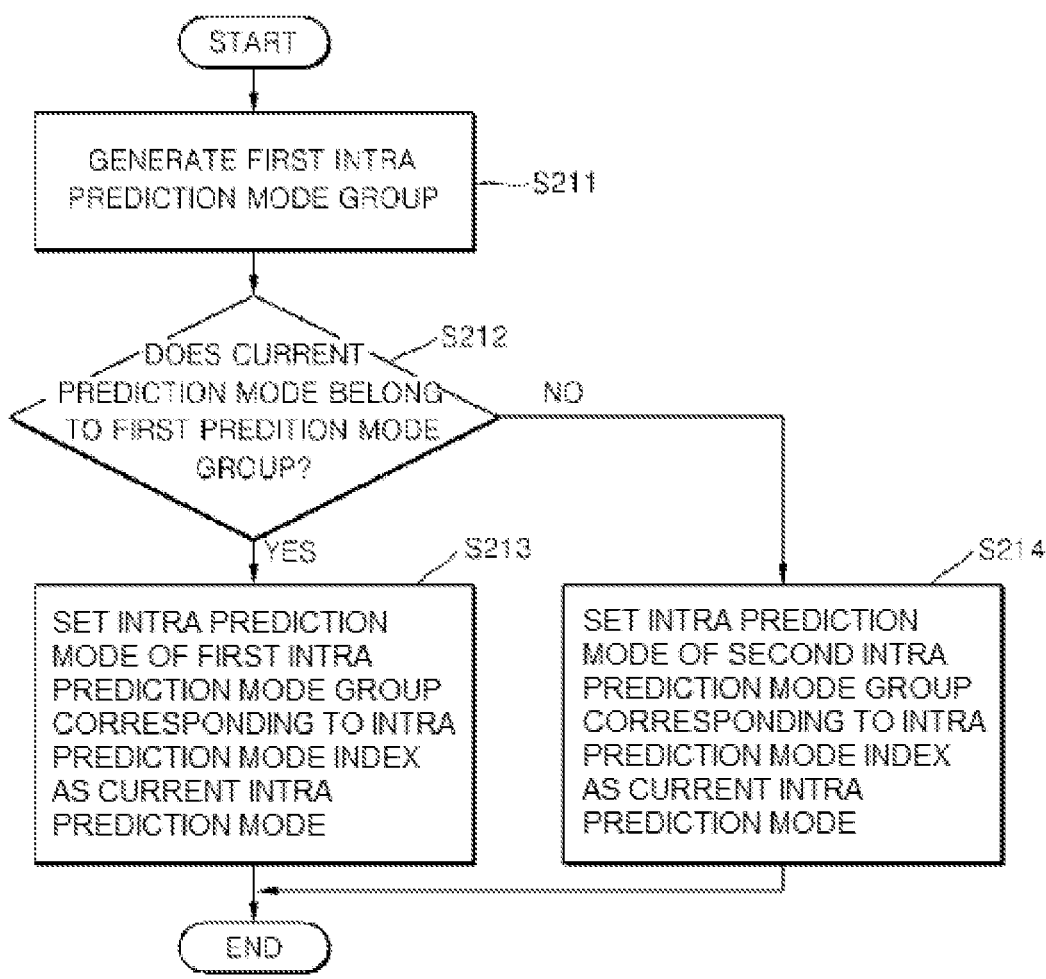
FIG. 9 is a flow chart illustrating another procedure for restoring intra prediction mode according to the present invention.

FIG. 9 is a flow chart illustrating another procedure for restoring intra prediction mode according to the present invention. The number of intra prediction modes belonging to a first intra prediction mode group is fixed.

First, a first intra prediction mode group is constructed using intra prediction modes of the prediction units adjacent to the current prediction unit (S211).

When the first intra prediction mode group includes two intra prediction modes, the first intra prediction mode group is constructed as follows.

It is determined whether the intra prediction modes of the above and left intra prediction units of the current prediction unit are available or not. If the available intra prediction mode is not one of the allowable intra prediction modes of the current prediction unit, the available intra prediction mode is converted to one of the allowable intra prediction modes. When both of the intra prediction modes of the above and left intra prediction units are available and are not same, the first intra prediction mode group is comprised of the intra prediction modes of the above and the left intra prediction units. When one of the intra prediction modes of the above and left intra prediction units is only available or when the intra prediction modes of the above and left intra prediction units are same, the first intra prediction mode group is comprised of the available intra prediction mode and one additional intra prediction mode. If the available intra prediction mode is not DC mode, the additional intra prediction mode may be DC mode. If the available intra prediction mode is DC mode, the additional intra prediction mode may be planar mode or vertical mode.

When the first intra prediction mode group includes three intra prediction modes, the first intra prediction mode group is constructed as follows.

It is determined whether the intra prediction modes of the above and left intra prediction units of the current prediction unit are available or not. If the available intra prediction mode is not one of the allowable intra prediction modes of the current prediction unit, the available intra prediction mode may be converted to one of the allowable intra prediction modes.

When both of the intra prediction modes of the above and left intra prediction units are available and are not same each other, the first intra prediction mode group is comprised of the two available intra prediction modes and one additional intra prediction mode. The additional intra prediction mode is different from the two available intra prediction modes and is one of a vertical mode, a horizontal mode and a DC mode. The additional intra prediction mode is the first intra prediction mode able to be added in the order of the DC mode, the vertical mode and the horizontal mode.

When only one of the intra prediction modes of the above and left intra prediction units is available or when the intra prediction modes of the above and left intra prediction units are same, the first intra prediction mode group is comprised of the one available intra prediction mode and two additional intra prediction modes. The two additional intra prediction modes are adaptively determined according to the available intra prediction modes and a size of the prediction unit. If the size of the intra prediction unit is equal to or smaller than a predetermined size and the available intra prediction mode is a directional mode, two intra prediction modes having direction closest to the direction of the available intra prediction mode are selected as the two additional intra prediction modes. But, if there exists only one intra prediction mode having direction closest to the direction of the available intra prediction mode (that is, the available intra prediction mode is mode 6 or 9), mode 6 or 9 is selected as the other additional intra prediction mode. If the available intra prediction mode is non-directional intra prediction mode, the two additional intra prediction modes are a vertical mode and a horizontal mode, or the other non-directional intra prediction mode and a vertical mode.

When all of the intra prediction modes of the above and left intra prediction units are unavailable, the first intra prediction mode group is comprised of three additional intra prediction modes. The three additional intra prediction modes may be a DC mode, a vertical mode and a horizontal mode, or a DC mode, a planar mode and a vertical mode.

When there exist a plurality of above prediction units of the current prediction unit, the plurality of above prediction units are scanned in a predetermined direction (e.g., from right to left) to determine the intra prediction mode of a first valid prediction unit as an above intra prediction mode. Also, when there exist a plurality of left prediction units of the current prediction unit, the plurality of left prediction units are scanned in a predetermined direction (e.g., from bottom to top) to determine the intra prediction mode of a first valid prediction unit as a left intra prediction mode.

Next, it is determined whether the intra prediction mode of the current prediction unit belongs to the first intra prediction mode group or not based on the intra prediction mode group indicator (S212).

If the intra prediction mode of the current prediction unit belongs to the first intra prediction mode group, the intra prediction mode of the first intra prediction mode group corresponding to the intra prediction mode index is determined as the intra prediction mode of the current prediction unit (S213).

If the intra prediction mode of the current prediction unit does not belong to the first intra prediction mode group, the intra prediction mode of the second intra prediction mode group corresponding to the intra prediction mode index is determined as the intra prediction mode of the current prediction unit (S214). The second intra prediction mode group includes all intra prediction modes other than the intra prediction modes belonging to the first intra prediction mode group. The intra prediction mode index is assigned in the order of the mode number of the intra prediction mode of the second intra prediction mode group.

Next, reference pixels are adaptively generated based on the restored intra prediction mode of the current prediction unit (S120).

When there are available reference pixels in only one side of the position of the unavailable reference pixel, the reference pixels are generated by copying the value of an available pixel closest to the unavailable pixel. Alternatively, the reference pixels are generated using two available pixels closest to the unavailable pixel. When the unavailable reference pixel exists between the available pixels, the reference pixel is generated using two available reference pixels closest to the unavailable pixel in both sides. The value of the generated reference pixel may be average of the two available reference pixels. Linear interpolation method may be used to generate the reference pixels when a difference between the two available reference pixels is large.

Next, the reference pixels are adaptively filtered based on the restored intra prediction mode (S130). When the restored intra prediction mode is a vertical mode, a horizontal mode or a DC mode, the reference pixels are not filtered. In directional intra prediction mode other than the vertical mode and the horizontal mode, the reference pixels are adaptively filtered. The rightmost pixel of the above reference pixels located at (x=2N−1, y=−1) and the lowest pixel of the left reference pixels located at (x=−1, y=2N−1) are not filtered. The reference pixel is filtered using two adjacent reference pixels.

Low-pass filter is applied to smooth the difference between adjacent reference pixels. The low-pass filter may be a 3-tap filter [1, 2, 1] or a 5-tap filter [1, 2, 4, 2, 1].

A filter is adaptively applied to the reference pixels according to the size of the prediction block in the directional intra prediction modes existing between a horizontal or vertical mode and the intra prediction mode having a direction of 45° with reference to the horizontal or vertical direction. The filter may be applied in a predetermined number of intra prediction modes closest to the mode having a direction of 45° with reference to the horizontal or vertical direction. The predetermined number may be increase as the size of the prediction block increases. For example, the filter is applied in a first number of intra prediction modes closet to mode 3, 6 or 9 for a size of 8×8, in a second number of intra prediction modes closet to mode 3, 6 or 9 for a size of 16×16 and in a third number of intra prediction modes closet to mode 3, 6 or 9 for a size of 32×32. The first number is equal to or smaller than the second number, and the second number is equal to or smaller than the third number.

Next, a prediction block is generated using the reference pixels according to the restored intra prediction mode (S140). The method of generating a prediction block is the same as that of the intra prediction block generating unit 254 of FIG. 6

The residual signals are entropy-decoded (S150).

The residual signals is inversely scanned (S160). That is, the residual signals are converted to two dimensional quantized transform block. One inverse scan pattern is selected among a plurality of inverse scan patterns for this conversion. The inverse scan pattern is determined according to the intra prediction mode of the current prediction unit. If the size of the transform unit is larger than a predetermined size, the residual signals are inversely scanned in the unit of subset, a quantized transform block is generated using a plurality of subsets. If the size of the transform unit is equal to the predetermined size, the residual signals are inversely scanned in the unit of transform unit.

The two dimensional quantized transform block is inversely quantized (S170). The quantization step size predictor of the current coding unit is determined for inverse quantization. The quantization step size predictor is determined using the same method as that of the inverse quantization unit 230 of FIG. 5. The determined quantization step size predictor and a received residual quantization step size are added to generate a quantization step size applied to transform block. The quantization matrix determined by the quantization step size is used to restore transform coefficients.

The inverse-quantized block is inversely transformed (S180). A inverse transform matrix type may be adaptively determined according to the restored intra prediction mode. The residual signals of the transform block may be inversely transformed by horizontal and vertical one-dimensional (1D) transform matrices. In intra prediction, there is a high possibility that the residual signals will have vertical directivity when the intra prediction mode of the current prediction unit is horizontal. Thus, the DCT-based integer matrix is applied to the vertical direction, and the DST or KLT-based integer matrix is applied to the horizontal direction. When the intra prediction mode is vertical, an inverse DST or KLT-based integer matrix is applied to the vertical direction, and an inverse DCT-based integer matrix is applied to the horizontal direction. When the intra prediction mode is a DC mode, an inverse DCT-based integer matrix is applied in the both directions.

The prediction block and the inverse-transformed block are added to generate a reconstructed image (S190). The residuals signals and the prediction signals may be added in the unit of coding unit.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. An apparatus for encoding an image, comprising:
a transform unit configured to transform a residual block obtained by calculating difference between an original block and the prediction block to generate a transform block;
a quantization unit configured to quantize the transform block to generate a quantized transform block;
a scanning unit configured to scans quantized transform coefficients of the quantized transform block to generate one dimensional (1D) coefficient sequence, wherein the quantized transform coefficients are divided into a plurality of sub-blocks if it is determined that a size of the transform block is equal to 8×8;
an entropy coder configured to entropy-code the 1D coefficient sequence; and
an intra predictor configured to generate a prediction block according to an intra prediction mode of a current prediction block,
wherein the intra predictor includes:
a prediction mode determiner configured to determine the intra prediction mode of the current prediction block; and
a prediction mode coder configured to generate an intra prediction mode group using available intra prediction modes of a left prediction block and an above prediction block neighboring the current prediction block and encode information indicating the intra prediction mode group and an intra prediction mode index corresponding to the intra prediction mode of the current prediction block when the intra prediction mode of the current prediction block is included in the intra prediction mode group,
wherein, when only one intra prediction mode out of the intra prediction modes of the left prediction unit and the above prediction unit is available and the one available intra prediction mode is a non-directional intra prediction mode, the intra prediction mode group includes a DC mode and a vertical mode,
wherein, when only one intra prediction mode out of the intra prediction modes of the left prediction unit and the above prediction unit is available and the one available intra prediction mode is a directional intra prediction mode, the intra prediction mode group includes the one available intra prediction mode, and two intra prediction modes closest to the one available intra prediction mode, one on each side, and
wherein the plurality of sub-blocks are scanned and non-zero coefficients of each sub-block are scanned according to a scan pattern, wherein said scan pattern for scanning the plurality of sub-blocks and for scanning the non-zero coefficients of each sub-block is determined according to the intra prediction mode of the current prediction block.

2. The apparatus of claim 1, wherein, when the one available intra prediction mode is a DC mode, another non-directional intra prediction mode is a planar mode.

3. The apparatus of claim 1, wherein the scanning unit scans the non-zero coefficients of each sub-block in a reverse direction from a last non-zero coefficient of each sub-block using one of a plurality of scan patterns.

* * * * *